March 8, 1938.  M. POIRIER  2,110,819
REAR WHEEL SUSPENSION
Original Filed Sept. 20, 1934  2 Sheets-Sheet 1
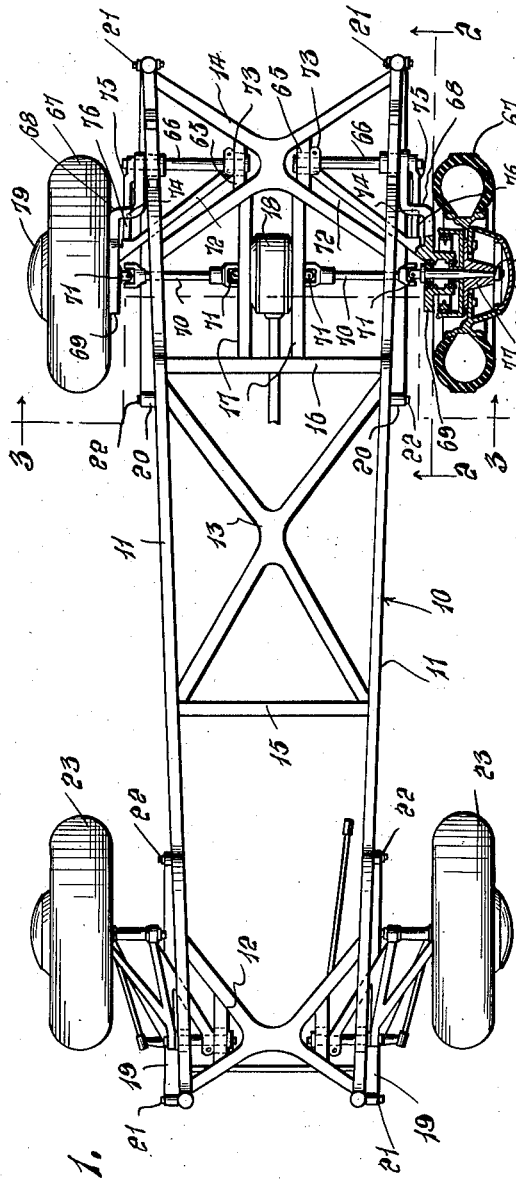
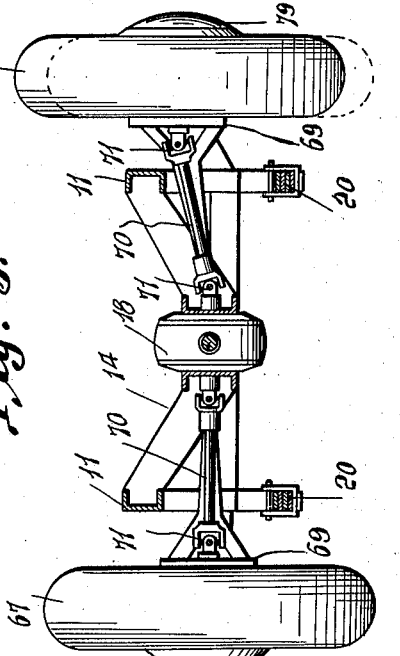
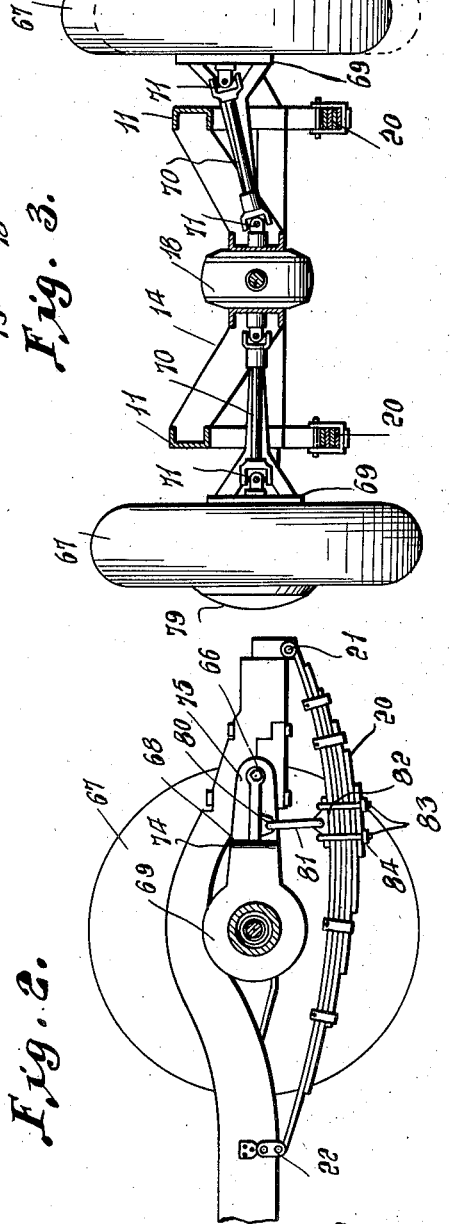
Inventor
Maurice Poirier
By L. F. Randolph
Attorney March 8, 1938. M. POIRIER 2,110,819
REAR WHEEL SUSPENSION
Original Filed Sept. 20, 1934   2 Sheets-Sheet 2
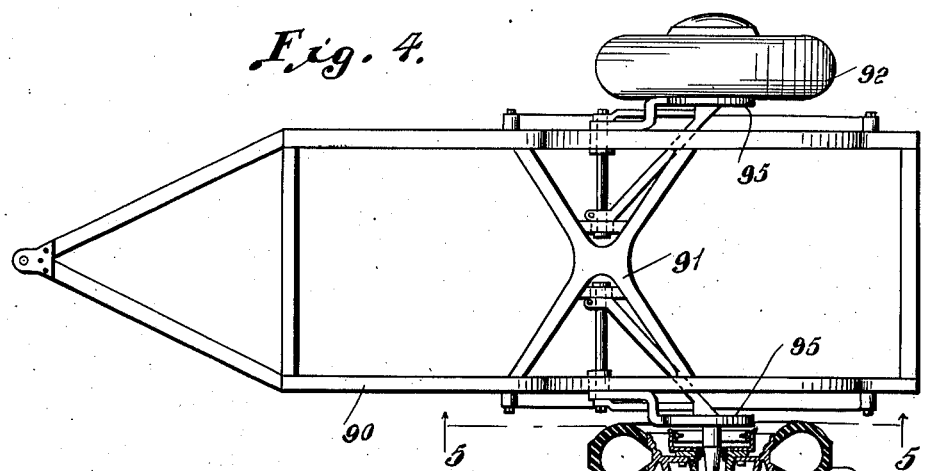
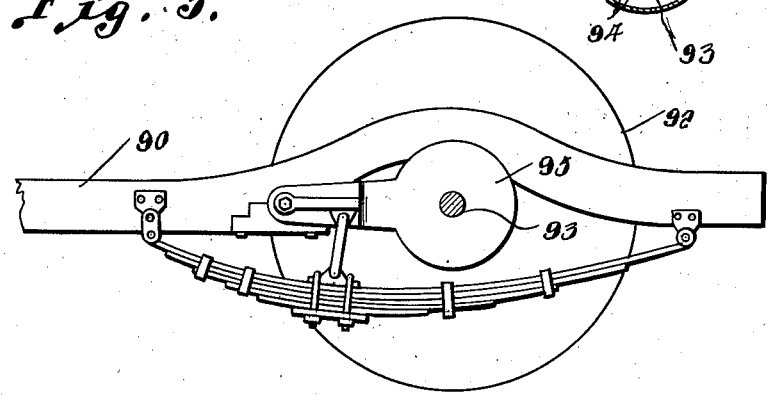
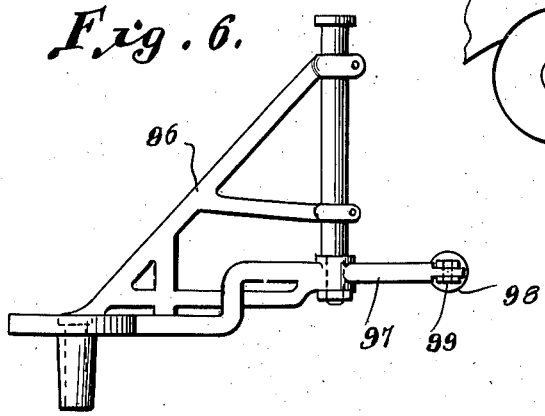
Inventor
Maurice Poirier Patented Mar. 8, 1938

2,110,819

UNITED STATES PATENT OFFICE 2,110,819

REAR WHEEL SUSPENSION

Maurice Poirier, Burbank, Calif.

Original application September 20, 1934, Serial No. 744,827. Divided and this application July 9, 1936, Serial No. 89,816

3 Claims. (Cl. 267—19)

This invention relates to improvements in rear vehicle wheel suspensions and in general aims to provide a construction which will coact to accomplish the objects disclosed in my copending application for Letters Patent on an improvement in vehicle wheel suspension, Serial Number 744,827, filed September 20, 1934, and allowed May 7, 1936.

The present application is a division of said allowed application.

The more specific objects and advantages will become apparent from a consideration of the description following taken in connection with accompanying drawings illustrating an operative embodiment.

In said drawings:—

Figure 1 is a view primarily in plan and partly in section showing my improvements applied in connection with an automobile chassis;

Figure 2 is a longitudinal sectional view taken on the line 2—2 of Figure 1;

Figure 3 is a detail cross sectional view primarily taken on the line 3—3 of Figure 1;

Figure 4 is a plan view showing the invention applied to a trailer;

Figure 5 is a vertical section taken on the plane of line 5—5 of Figure 4;

Figure 6 is a plan view of a modified form of bracket mounting for the rear wheels, and Figure 7 is an elevational view of the bracket of Figure 6.

Referring specifically to the drawings, a suitable, usually steel, chassis frame is provided as at 10 having side beams 11 slightly converging towards the front of the vehicle. Such beams are jointed and reinforced by X-shaped elements or spiders 12, 13 and 14, respectively being adjacent the front, center and rear of the chassis frame. The beams 11 are spanned by cross beams 15 and 16 adjacent the connections with the spider 13, and parallel beams 17 join the beams 16 and frame 14, to form a more efficient support and mounting for a conventional differential drive 18 for the automobile.

Semielliptical laminated springs are provided at the front of the chassis frame at 19 and at the rear of such frame at 20, being connected to the frame at one end by bolts as at 21, and at the other end by means of shackles 22. It will be noted that all of said springs 19 and 20 are in parallelism with the central longitudinal median line of the chassis frame.

The front wheels of the vehicle are designated 23 and are mounted for truly vertical movement, individually and always from a horizontal axis. The specific mounting operation and steering thereof, is disclosed and claimed in my aforesaid allowed application, Serial Number 744,827 and is omitted here as it forms no part of the present invention.

The rear spider 14 has struts at 65. Journaled in suitable bearings in the beams 11 and said struts 65 are stub cross shafts 66 constituting parts for the mounting of rear wheels 67.

Brackets 68 are rigidly connected to the stub shafts 66, such brackets including hubs 69 through which the rear axle 70 passes and which rear axle 70 at various locations has universal joints 71 therein to enable the axle to displace as suggested in Figure 7, to accord with the individual vertical movement or yielding of the rear wheels 67. From the hubs 69 diagonal bars 72 extend to the stub shafts 66, being clamped thereto as at 73. Also extending from said hubs 69 are rearwardly extending arms 74 and 75, rigidly secured to stub shafts 66, the arms 74 preferably having an offset portion 76 as shown, to afford greater strength. The wheel 67, by means of its body 77, is detachably mounted on the rear axle 70 as by means of a nut 78, accessible when a hub cap 79 is removed.

Said offset portion 76 has a boss 80 thereon, pivotally mounting a link 81, which at its lower end is pivotally mounted in a block 82, fastened in place by U-bolts 83 and a plate 84, which primarily serve to secure the laminations of the springs 20 together.

It will be seen that the bracket and stub shaft 66 of each rear wheel, swing as a unit from the axes of such stub shafts, and that the rear wheels move therewith, controlled by the link 81, and the springs 20.

The side beams 11 are upwardly arched adjacent each of the wheels, in order to afford clearance for effective operation of the adjacent parts.

Referring now to Figures 4 and 5, the novel suspension is shown as applied to a trailer. 90 designates the body thereof which has only one X-shaped part or spider at 91. The wheels 92 are mounted and suspended identically like the rear wheels 67, with the exception that there is no transmission and such wheels are freely journaled on stub axles 93, with bearings 94 interposed. Such stub axles 93 extend from hubs or plates 95, being a modification of those at 69.

In Figures 6 and 7, a modified form of the mounting bracket for the rear wheels, here designated 96, has a longitudinal extension at 97 which may be connected with a dash pot or hydraulic means 98 by a pivot at 99 and which dash pot or hydraulic means in turn, at 100, is adapted to be pivoted to the frame 10. Such dash pot or hydraulic means 98 is of any suitable regulatable type which is adjustable to control the flow of fluid between the parts thereof to accordingly control the action of bracket 96.

It will be observed that I have provided an individual wheel suspension for the rear wheels of an automotive or other vehicle, to coact with the front wheel suspension of my aforesaid application by means of which the wheels are firmly assembled on the chassis frame with novel bracket arms, which rigidly maintain in perfect alinement the wheels with the chassis frame, and at the same time, both the longitudinal and vertical components of road shock imparted to the wheels are absorbed.

Various changes may be resorted to provided they fall within the spirit and scope of the invention.

I claim as my invention:—

1. A wheel mounting of the class described, in combination with a chassis member, a bolster spring below said chassis member and having its opposite ends connected thereto, a bracket located intermediate the ends of said spring, said bracket having one end journaled on the chassis member and having its other end free and provided with a hub located between the chassis member and bolster spring to mount a wheel, and a connection between said bracket intermediate the pivotal axis of the bracket and the axis of the hub and said spring bolster intermediate the ends of the latter, closer to one end of said spring bolster than to the other end of said spring bolster.

2. A wheel mounting of the class described, in combination with a chassis member, a bolster spring below said chassis member and having its opposite ends connected thereto, a bracket located intermediate the ends of said spring, said bracket having one end journaled on the chassis member and having its other end free and provided with a hub located between the chassis member and bolster spring to mount a wheel, and a connection between said bracket intermediate the pivotal axis of the bracket and the axis of the hub and said spring bolster intermediate the ends of the latter at the zone of greatest stiffness, said zone being eccentric with respect to the ends of the spring bolster.

3. A wheel mounting of the class described, in combination with a chassis member, a bolster spring below said chassis member and having its opposite ends connected thereto, a bracket located intermediate the ends of said spring, said bracket having one end journaled on the chassis member and having its other end free and provided with a hub located between the chassis member and bolster spring to mount a wheel, and a connection between said bracket intermediate the pivotal axis of the bracket and the axis of the hub and said spring bolster intermediate the ends of the latter, said spring bolster being of the laminated type, the center of the laminations being eccentric with respect to the ends of the spring, and said connections being substantially at said center.

MAURICE POIRIER.